(12) United States Patent
Osamura et al.

(10) Patent No.: US 8,999,120 B2
(45) Date of Patent: Apr. 7, 2015

(54) IONIZED WATER PRODUCTION METHOD AND PRODUCTION DEVICE

(75) Inventors: Kazunori Osamura, Ayase (JP); Takao Kawajiri, Kushiro (JP); Yutaka Nakamura, Kushiro (JP); Noboru Kudo, Kushiro (JP); Masae Shimizu, Sakura (JP)

(73) Assignee: Kabushiki Kaisha Alone World, Yokohama-shi, Kanagawa (JP)

( * ) Notice: Subject to any disclaimer, the term of this patent is extended or adjusted under 35 U.S.C. 154(b) by 182 days.

(21) Appl. No.: 13/509,687

(22) PCT Filed: Nov. 10, 2011

(86) PCT No.: PCT/JP2011/075983
§ 371 (c)(1),
(2), (4) Date: May 14, 2012

(87) PCT Pub. No.: WO2012/067018
PCT Pub. Date: May 24, 2012

(65) Prior Publication Data
US 2012/0255874 A1    Oct. 11, 2012

(30) Foreign Application Priority Data

Nov. 17, 2010    (JP) ................................. 2010-257000

(51) Int. Cl.
*C02F 1/461*    (2006.01)
*C25B 9/08*    (2006.01)

(52) U.S. Cl.
CPC ..... *C02F 1/4618* (2013.01); *C02F 2201/46115* (2013.01); *C02F 2001/4619* (2013.01); *C02F 2201/003* (2013.01); *C02F 2201/4614* (2013.01); *C02F 2301/08* (2013.01)

(58) Field of Classification Search
CPC .................................................. C02F 1/4618
See application file for complete search history.

(56) References Cited

U.S. PATENT DOCUMENTS

| | | | |
|---|---|---|---|
| 4,057,474 A | 11/1977 | Kurtz et al. | |
| 4,810,344 A * | 3/1989 | Okazaki | 204/230.5 |
| 5,624,544 A * | 4/1997 | Deguchi et al. | 205/742 |
| 2002/0036134 A1* | 3/2002 | Shirota et al. | 204/263 |

FOREIGN PATENT DOCUMENTS

| | | |
|---|---|---|
| JP | 58-85225 U | 6/1983 |
| JP | 59-190392 U | 12/1984 |
| JP | 64-56188 U | 4/1989 |
| JP | 8-24865 A | 1/1996 |
| JP | 2005-177597 A | 7/2005 |

OTHER PUBLICATIONS

International Search Report dated Jan. 17, 2012 in counterpart International Application No. PCT/JP2011/075983.
Supplementary European Search Report dated Oct. 14, 2014, issued in counterpart European Application No. 11841256.8.

* cited by examiner

*Primary Examiner* — Keith Hendricks
*Assistant Examiner* — Salil Jain
(74) *Attorney, Agent, or Firm* — Holtz, Holtz, Goodman & Chick PC

(57) ABSTRACT

An energy-saving ionized water production device and a production method are provided that are capable of producing strongly alkaline ionized in a short period of time.
An ionized water production device 1 is used that is configured such that a first electrolysis cell 20A is arranged in a first electrolysis bath 10A, a second electrolysis cell 20B is arranged in a second electrolysis bath 10B, and alkaline ionized water formed in an electrolysis diaphragm 21 of the first electrolysis cell 20A is quantitatively and continuously transferred to an electrolysis diaphragm of the second electrolysis cell 20B by a transfer pump 50 arranged in a water filling pipe 27A of the first electrolysis cell 20A, and current is applied by setting the current applied to the first electrolysis cell 20A to 5 amperes to 15 amperes and setting the current applied to the second electrolysis cell 20B to 15 amperes to 20 amperes within a range of a total current applied to the first electrolysis cell 20A and the second electrolysis cell 20B of 25 amperes to 30 amperes.

1 Claim, 1 Drawing Sheet

IONIZED WATER PRODUCTION METHOD AND PRODUCTION DEVICE

This application is a U.S. National Phase Application under 35 USC 371 of International Application PCT/JP2011/075983 filed Nov. 17, 2010.

TECHNICAL FIELD

The present invention relates to a method of producing ionized water obtained by electrolyzing raw material water, particularly, ionized water capable of stably maintaining a pH value far removed from neutrality (pH 7) over a long period of time, and to a production device thereof.

BACKGROUND ART

A known example of a method of producing ionized water by electrolyzing raw material water is described in Patent Document 1. In providing a brief explanation of the ionized water production method described in this document, a ionized water production device is prepared in which six cylindrical electrolysis cells (each consisting of a ceramic electrolysis diaphragm, a cathode arranged on the inside thereof, and an anode arranged on the outside of the electrolysis diaphragm) are arranged in a single electrolysis bath, a raw material supply source (such as a water pipe) is connected to a water filling pipe of a first electrolysis cell, a drain pipe of the first electrolysis cell is linked with a water filling pipe of the second electrolysis cell adjacent thereto, and the drain pipes and water filling pipes between adjacent electrolysis cells are connected in series for the other electrolysis cells as well.

A supporting electrolyte (saltwater) is filled into the electrolysis bath, and current is applied between the cathode and anode of each electrolysis cell while continuously supplying raw material water to the first electrolysis cell from the raw material water supply source. The raw material water supplied to the first electrolysis cell is electrolyzed, alkaline ionized water is formed within the electrolysis diaphragm, and acidic ionized water is formed outside the electrolysis diaphragm. The alkaline ionized water formed within the electrolysis diaphragm is transferred to the second electrolysis cell as a result of being pushed out by subsequent raw material water, sequentially passes through the third to sixth electrolysis cells, and is finally discharged outside the device. Since electrolysis is also carried out when the alkaline ionized water passes through the second to sixth electrolysis cells, the alkaline ionized water discharged outside the device demonstrates strong alkalinity of pH 12.0 or higher.

Patent Document 1: Japanese Patent Publication No. H8-24865

According to conventional production methods as previously described, although strongly alkaline ionized water can be continuously produced, in addition to the production thereof requiring considerable time, there is also the problem of the consumption of a considerable amount of electrical power in order to carry out electrolysis. More specifically, in the case of using an ionized water production device in which six electrolysis cells having a volume of 1.5 L each are arranged in an electrolysis bath, and setting the current applied to the electrolysis cells to a total of 18 amperes (100V), the time required to produce 10 L of strongly alkaline ionized water having a pH of 12.0 or higher is 60 minutes. In addition, the amount of electrical power consumed in this case is 1800 Wh. Consequently, there is a desire for the development of a device and method that enables strongly alkaline ionized water to be produced in a shorter period of time while consuming less energy.

DISCLOSURE OF THE INVENTION

With the foregoing in view, an object of the present invention is to provide an energy-saving device and method for producing ionized water capable of producing strongly alkaline ionized water in a short period of time.

The ionized water production method according to the present invention is a method of producing ionized water using an ionized water production device in which electrolysis cells, each of which is composed of a bottomed, cylindrical electrolysis diaphragm, a cathode arranged to the inside of the electrolysis diaphragm and an anode arranged to the outside of the electrolysis diaphragm, are arranged inside electrolysis baths, a supporting electrolyte is filled to the outside of the electrolysis diaphragm, raw material water is introduced to the inside of the electrolysis diaphragm, and the raw material water is electrolyzed by applying current to the cathode and the anode, wherein the ionized water production device has as electrolysis baths mutually independent first and second electrolysis baths, and as electrolysis cells first and second electrolysis cells, the first electrolysis cell is arranged inside the first electrolysis bath while the second electrolysis cell is arranged inside the second electrolysis bath, a water filling pipe and a drain pipe are respectively attached to the first electrolysis cell and the second electrolysis cell, and alkaline ionized water formed within the electrolysis diaphragm of the first electrolysis cell is quantitatively and continuously transferred to within the electrolysis diaphragm of the second electrolysis cell by a transfer pump arranged in the water filling pipe of the first electrolysis cell, and current is applied by setting current applied to the first electrolysis cell to any value within a range of 5 amperes to 15 amperes and setting current applied to the second electrolysis cell to any value within a range of 15 amperes to 20 amperes, within a range of a total current applied to the first electrolysis cell and the second electrolysis cell of 25 amperes to 30 amperes.

In addition, the ionized water production device according to the present invention device is a device for producing ionized water configured by arranging inside electrolysis baths electrolysis cells, each of which is composed of a bottomed, cylindrical electrolysis diaphragm, a cathode arranged to the inside of the electrolysis diaphragm and an anode arranged to the outside of the electrolysis diaphragm, and filling a supporting electrolyte to the outside of the electrolysis diaphragm and introducing raw material water to the inside of the electrolysis diaphragm, and moreover electrolyzing the raw material water by applying current to the cathode and the anode, wherein the ionized water production device has as electrolysis baths mutually independent first and second electrolysis baths, and as electrolysis cells first and second electrolysis cells, the first electrolysis cell is arranged inside the first electrolysis bath while the second electrolysis cell is arranged inside the second electrolysis bath, and a water filling pipe and a drain pipe are respectively attached to the first electrolysis cell and the second electrolysis cell, and alkaline ionized water formed within the electrolysis diaphragm of the first electrolysis cell is quantitatively and continuously transferred to within the electrolysis diaphragm of the second electrolysis cell by a transfer pump arranged in the water filling pipe of the first electrolysis cell.

According to the ionized water production method (production device) according to the present invention, the time required for production can be shortened to one-third that of conventional methods (conventional devices), and the amount of electrical power consumed can be reduced to one-half or less. Moreover, since the volume of the electrolysis baths can be reduced, in addition to being able to reduce the amount of supporting electrolyte used to fill the electrolysis baths, the overall size of the device can be reduced. In addition, although required production time varies according to the environment (such as the state of the electrolysis diaphragms or seasonal temperature changes), the production method (production device) of the present invention enables stable and quantitative production of ionized water without being affected by environmental changes in comparison with conventional methods.

DESCRIPTION OF THE PREFERRED EMBODIMENTS

Figure 1:
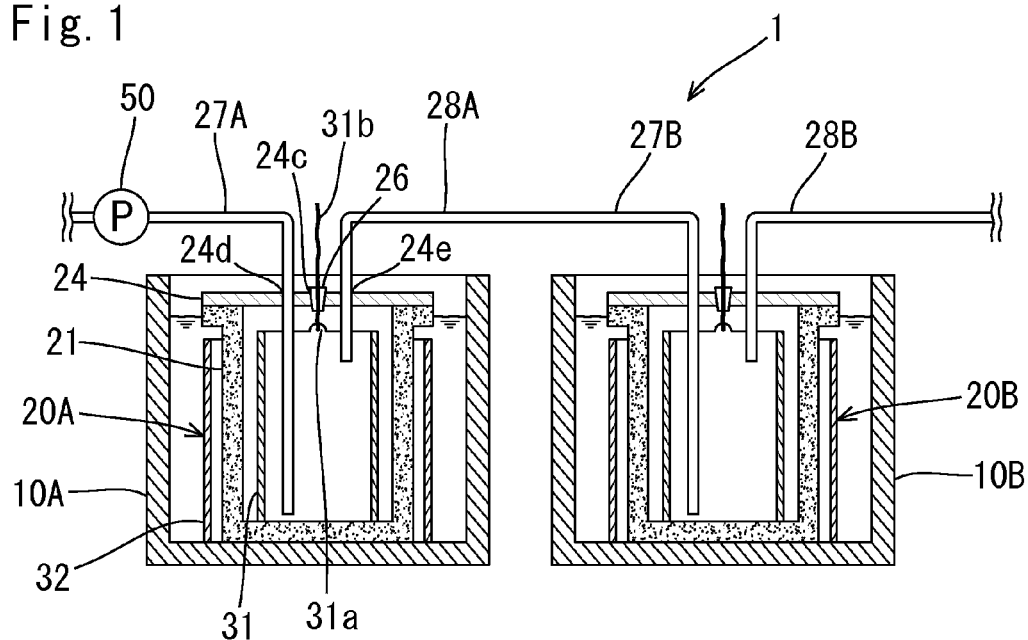
FIG. 1 is a cross-sectional view of an ionized water production device 1 according to a first embodiment of the present invention.

The following provides an explanation of embodiments of the "ionized water production device" of the present invention. As shown in FIG. 1, an ionized water production device 1 according to a first embodiment of the present invention is basically composed of two plastic electrolysis baths 10 (first electrolysis bath 10A and second electrolysis bath 10B), cylindrical electrolysis cells 20 (first electrolysis cell 20A and second electrolysis cell 20B), one each of which is respectively arranged in the electrolysis baths 10, and a transfer pump 50.

Figure 2:
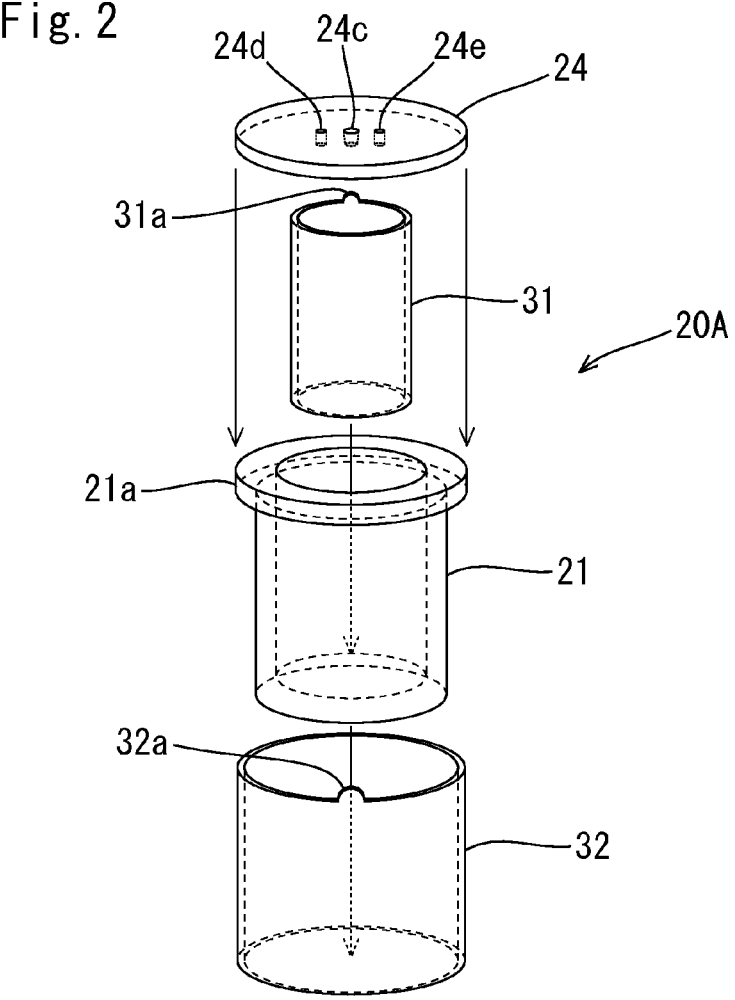
FIG. 2 is an exploded perspective view of a first electrolysis cell 20A shown in FIG. 1.

FIG. 2 is an exploded perspective view of the first electrolysis cell 20A. The first electrolysis cell 20A is composed of an electrolysis diaphragm 21, a cathode 31, an anode 32 and a cover 24. Furthermore, the configuration of the second electrolysis cell 20B is completely identical to that of the first electrolysis cell 20A.

The electrolysis diaphragm 21 is made of ceramic and is formed into a cylindrical shape having an open top and a closed bottom (bottomed cylindrical shape), and a flange 21a is formed around the upper end thereof. In the present embodiment, the volume of the electrolysis diaphragm 21 is set to 1.5 L and the thickness is set to 7 mm.

The cylindrical cathode 31 is arranged to the inside of the electrolysis diaphragm 21, while the cylindrical anode 32 is arranged to the outside, and the cathode 31 and the anode 32 are mutually opposed at a fixed interval on both sides of the electrolysis diaphragm 21. Furthermore, the dimensions (diameters) of the electrolysis diaphragm 21, the cathode 31 and the anode 32 are set so that the interval between them is small so as to be able to inhibit current resistance values as much as possible.

The cathode 31 is obtained by molding perforated metal composed of stainless steel into the shape of a cylinder, a lead wire terminal 31a is provided on the upper portion thereof, and as shown in FIG. 1, a lead wire 31b is connected to the lead wire terminal 31a.

The anode 32 is obtained by molding perforated metal composed of Pt-clad (laminated) titanium (Ti) into the shape of a cylinder, a lead wire terminal 32a is provided on the upper portion thereof, and a lead wire not shown is connected to the lead wire terminal 32a.

The plastic cover 24 is attached to the open upper end surface (upper surface of the flange 21a) of the electrolysis diaphragm 21. Three through holes 24c to 24e are provided in the cover 24 as shown in FIG. 2, a rubber plug 26 is attached to the through hole 24c as shown in FIG. 1, and the lead wire 31b passes through a central axial hole of the plug 26.

As shown in FIG. 1, a water filling pipe 27A and a drain pipe 28A are respectively attached to the upper portion of the first electrolysis cell 20A. The water filling pipe 27A is for introducing raw material water (such as tap water, ground water or filtered water thereof) into the electrolysis diaphragm 21 of the first electrolysis cell 20A, one end thereof is connected to a raw material water supply source (such as a raw material water tank or faucet of a water line), and the other end is inserted into the electrolysis diaphragm 21 from a through hole 24d in the cover 24. Furthermore, the transfer pump 50 is arranged at an intermediate location in the water filling pipe 27A. The drain pipe 28A is for discharging alkaline ionized water formed in the electrolysis diaphragm 21 of the first electrolysis cell 20A to the outside, one end thereof is inserted into the electrolysis diaphragm 21 from the through hole 24e, and the other end is connected to a water filling pipe 27B of the second electrolysis cell 20B.

In addition, the water filling pipe 27B and a drain pipe 28B are also attached to the upper portion of the second electrolysis cell 20B. The water filling pipe 27B is for introducing alkaline ionized water formed in the electrolysis diaphragm 21 of the first electrolysis cell 20A into the electrolysis diaphragm of the second electrolysis cell 20B, one end thereof is connected to the drain pipe 28A of the first electrolysis cell 20A, and the other end is inserted into the electrolysis diaphragm from a through hole in a cover. The drain pipe 28B is for discharging alkaline ionized water in the electrolysis diaphragm of the second electrolysis cell 20B to the outside, and one end thereof is inserted into the electrolysis diaphragm from a through hole.

In the present embodiment configured in this manner, the drain pipe 28A of the first electrolysis cell 20A and the water filling pipe 27B of the adjacent second electrolysis cell 20B are connected in series, alkaline ionized water formed in the electrolysis diaphragm 21 of the first electrolysis cell 20A is supplied to the electrolysis diaphragm of the second electrolysis cell 20B, and alkaline ionized water having a high pH value is discharged from the drain pipe 28B of the second electrolysis cell 20B.

Furthermore, discharge ports (not shown) for removing acidic ionized water having a low pH value formed outside the electrolysis cells 20 (20A and 20B) are respectively provided in the first electrolysis bath 10A and the second electrolysis bath 10B.

The electrolysis cells 20 used in the ionized water production device 1 according to the present embodiment is in common with the electrolysis cells of a conventional device (ionized water production device described in Patent Document 1) with respect to having nearly the same configuration, the ionized water production device 1 of the present embodiment differs greatly from the conventional device with respect to the points indicated below.

A first difference is that, in contrast to six electrolysis cells being arranged in a single common electrolysis bath in the conventional device (wherein the electrolysis bath and the electrolysis cells are in a "one-to-many" relationship), in the present embodiment, one electrolysis cell each is respectively arranged in mutually independent electrolysis baths (wherein the electrolysis baths and the electrolysis cells are in a "one-to-one" relationship). Although electrical energy (fixed amount of direct current) is dispersed among six electrolysis cells in the conventional device, since electrical energy is concentrated in each electrolysis cell in the present embodiment, electrolysis treatment can be effectively carried out on the raw material water in each electrolysis cell.

A second difference is that, in contrast to the number of electrolysis cells used in the conventional device being six, in the present embodiment, the number of electrolysis cells is two. Since the finished product can be produced while reducing the number of electrolysis cells, consumable parts such as electrolysis diaphragms can be reduced, thereby making it possible to reduce running cost, while also leading to reduced size and weight of the device overall.

A third difference is the method used to transfer ionized water formed in the electrolysis cells. In contrast to a law of nature in the form of "water flowing from a high location to a low location" being applied for the method used to transfer ionized water in the conventional device, in the present embodiment, alkaline ionized water formed in the electrolysis diaphragm of the first electrolysis cell is quantitatively and continuously forcibly transferred to the electrolysis diaphragm of the second electrolysis cell by a transfer pump. It was determined that finished products can be obtained by allowing electrical energy to concentrate in each electrolysis cell and controlling the work environment even if the formed internal alkaline ionized water is forcibly transferred. In addition, a stable production volume can be secured.

Continuing, the following provides an explanation of an ionized water production method (method of using the ionized water production device 1 of FIG. 1) that uses the ionized water production device of the first embodiment as a second embodiment of the present invention. First, a supporting electrolyte (saltwater having a concentration of 5% to 10%) is injected into the first electrolysis bath 10A and the second electrolysis bath 10B (outside the electrolysis diaphragm 21), and the transfer pump 50 is then operated to quantitatively (0.5 L/min) and continuously introduce raw material water into the electrolysis diaphragm 21 of the first electrolysis cell 20A. Furthermore, the injected amount of the supporting electrolyte is to a degree such that the water level in each electrolysis bath 10 (10A, 10B) does not exceed the upper end of the electrolysis diaphragm 21.

Next, a voltage is applied between the cathode 31 and the anode 32 of the first electrolysis cell 20A to generate a direct current. Voltage is applied (current is generated) by via the lead wire 31b connected to the lead wire terminal 31a of the cathode 31 (see FIG. 1) and a lead wire (not shown) connected to the lead wire terminal 32a of the anode 32 (see FIG. 2).

Raw material water injected into the electrolysis diaphragm 21 of the first electrolysis cell 20A is electrolyzed by direct current flowing between the cathode 31 and the anode 32, alkaline ionized water is formed inside the electrolysis diaphragm 21, and acidic ionized water is formed outside the electrolysis diaphragm 21.

Since raw material water is continuously introduced into the first electrolysis cell 20A by the transfer pump 50 as previously described, and the electrolysis diaphragm 21 of the first electrolysis cell 20A is sealed by the cover 24, when the first electrolysis cell 20A is filled, alkaline ionized water inside the electrolysis diaphragm 21 of the first electrolysis cell 20A is quantitatively (0.5 L/min) and continuously transferred to the electrolysis diaphragm 21 of the second electrolysis cell 20B.

Once alkaline ionized water transferred from the first electrolysis cell 20A has accumulated inside the electrolysis diaphragm 21 of the second electrolysis cell 20B, a voltage is applied between the cathode 31 and the anode 32 of the second electrolysis cell 20B and generation of a direct current is begun. Whereupon, alkaline ionized water injected into the electrolysis diaphragm 21 of the second electrolysis cell 20B is further electrolyzed by the direct current flowing between the cathode 31 and the anode 32, and the alkaline ionized water reaches a higher pH (becomes more strongly alkaline).

Since the electrolysis diaphragm 21 of the second electrolysis cell 20B is sealed by the cover 24, when the water level inside the electrolysis diaphragm 21 of the second electrolysis cell 20B rises to the full level, alkaline ionized water inside the electrolysis diaphragm 21 of the second electrolysis cell 20B is quantitatively (0.5 L/min) and continuously discharged outside the device.

Strongly alkaline ionized water having a high pH can then be produced continuously by subsequently continuously carrying out supply of raw material water to the first electrolysis cell 20A (at 0.5 L/min), application of current to the first electrolysis cell 20A, transfer of alkaline ionized water from the first electrolysis cell 20A to the second electrolysis cell 20B (at 0.5 L/min), application of current to the second electrolysis cell 20B, and discharge of alkaline ionized water outside the device from the second electrolysis cell 20B (at 0.5 L/min). Moreover, in comparison with the case of producing alkaline ionized water according to the conventional production method, alkaline ionized water having a pH nearly equal to that of alkaline ionized water produced according to the conventional production method can be produced in a shorter period of time (equal to one-third that required by the conventional method) while using less energy (using electrical power equal to one-half or less that of the conventional method).

The following provides an explanation of the results of experiments carried out by the inventors of the present invention on the "ionized water production method" of the present invention in the form of examples of the present invention.

First, the ionized water production device 1 explained as a first embodiment (see FIG. 1) was prepared, and alkaline ionized water was produced a total of eight times according to the ionized water production method explained as a second embodiment while changing current application conditions. The conditions for applying current in the first round of production (Example 1) to the eighth round of production (Example 8) are shown in Table 1 along with other findings including the measured pH values of the alkaline ionized water produced.

TABLE 1

| Example | First Cell | Second Cell | Total | pH | Power Consumption (for 20 min) |
|---|---|---|---|---|---|
| 1 | 05 A | 10 A | 15 A | 11.82 | 500 Wh |
| 2 | 05 A | 15 A | 20 A | 11.95 | 667 Wh |
| 3 | 05 A | 20 A | 25 A | 12.06 | 833 Wh |
| 4 | 10 A | 15 A | 25 A | 12.17 | 833 Wh |
| 5 | 10 A | 20 A | 30 A | 12.16 | 1000 Wh |
| 6 | 15 A | 15 A | 30 A | 12.18 | 1000 Wh |
| 7 | 15 A | 20 A | 35 A | 12.26 | 1167 Wh |
| 8 | 20 A | 20 A | 40 A | 12.31 | 1333 Wh |

In Table 1 above, numbers shown in the column entitled "First Cell" indicate the values of current applied to the first electrolysis cell 20A shown in FIG. 1 (units: amperes), while numbers shown in the column entitled "Second Cell" indicate the values of current applied to the second electrolysis cell 20B shown in FIG. 1. In addition, numbers shown in the column entitled "Total" indicate the total of those current values. Values indicated in the column entitled "pH" indicate measured pH values of alkaline ionized water produced after 30 minutes had elapsed from the start of production.

In the ionized water production method carried out here, since alkaline ionized water inside the electrolysis diaphragm 21 of the second electrolysis cell 20B was set to be discharged outside the device at the rate of 0.5 L per minute with a drainage pump 50B, in theory, 10 L of alkaline ionized water can be produced in 20 minutes. In actuality, 10 L of alkaline ionized water were able to be produced in 20 minutes without incident in each of Examples 1 to 8. Since the amount of time required to produce 10 L of alkaline ionized water in the case of the conventional method (ionized water production method described in Patent Document 1) was 60 minutes, the present invention was able to reduce this required time to one-third that of the conventional method.

In addition, the following matters were confirmed based on the results shown in the above-mentioned Table 1 with respect to the conditions for applying current in the alkaline ionized water production method of the present examples. First, in cases in which the total value of current applied to the first electrolysis cell and the second electrolysis cell was 20 amperes or less (Examples 1 and 2), the pH of the alkaline ionized water produced did not reach "12", thereby demonstrating function inferior in comparison with alkaline ionized water produced according to the conventional method. On the other hand, in cases in which the total value of current applied to the first electrolysis cell and the second electrolysis cell was set to current application conditions of 25 amperes or more (Example 3 to 8), the pH of the resulting alkaline ionized water exceeded "12", thereby demonstrating that alkaline ionized water can be produced that has a function equal to or greater than that of alkaline ionized water produced according to the conventional method. Thus, in the alkaline ionized water production method of the present invention, current application conditions are considered to be preferably set such that the total current value is 25 amperes or more.

Moreover, when the amount of time required to produce 10 L of alkaline ionized water according to the present examples as previously described was made to be 20 minutes, the electrical power consumption in this case (amount of electrical power required to produce 10 L of alkaline ionized water) was 833 Wh in Example 3, thereby demonstrating that power consumption can be reduced to "one-half or less" (and more precisely, "46.2%") the amount of electrical power of 1800 Wh consumed in the conventional method.

Furthermore, the amount of electrical power consumption in Example 7 was 1167 Wh, which is about 1.4 times that of Example 3, while the amount of electrical power consumption in Example 8 was 1333 Wh, which is about 1.6 times that of Example 3. Although the pH values in Examples 7 and 8 were naturally higher than that of Example 3, that increase can be said to be relatively small in comparison with the size of the increase in electrical power consumption. When considering that alkaline ionized water can be expected to demonstrate adequate function provided the pH thereof is "12" or higher, current application conditions within the range of Examples 3 to 6 (current of first electrolysis cell: 5 amperes to 15 amperes, current of second electrolysis cell: 15 amperes to 20 amperes, total current: 25 amperes to 30 amperes) are considered to be the most preferable.

In addition, there was hardly any change between pH values of the alkaline ionized water of Examples 1 to 8 at three months after production and those at the time of production. Thus, alkaline ionized water produced according to this method was confirmed to be able to maintain a stable pH over a long period of time in the same manner as alkaline ionized water produced according to the conventional method.

Explanation of Reference Numerals

1 Ionized water production device
10 Electrolysis baths
10A First electrolysis bath
10B Second electrolysis bath
20 Electrolysis cells
20A First electrolysis cell
20B Second electrolysis cell
21 Electrolysis diaphragm
21a Flange
24 Cover
24c to 24e Through holes
26 Plug
27A, 27B Water filling pipe
28A, 28B Drain pipe
31 Cathode
32 Anode
31a Lead wire terminal
31b Lead wire
32a Lead wire terminal
50 Transfer pump

The invention claimed is:

1. An ionized water production method using an ionized water production device in which electrolysis cells, each of which comprises a bottomed, cylindrical electrolysis diaphragm, a cathode arranged inside the electrolysis diaphragm, and an anode arranged outside the electrolysis diaphragm, are arranged inside respective plastic electrolysis baths, and a supporting electrolyte is filled in the plastic electrolysis baths outside of respective electrolysis diaphragms such that the electrolysis cells are immersed in the supporting electrolyte and such that both a first surface of the anode, that faces a corresponding electrolysis diaphragm, and a second surface of the anode, that is opposite to the first surface and that faces an inner surface of a corresponding plastic electrolysis bath, are immersed in the supporting electrolyte, wherein the ionized water production device consists of, as the plastic electrolysis baths, mutually independent first and second electrolysis baths, and the ionized water production device consists of, as the electrolysis cells, first and second electrolysis cells, wherein the first electrolysis cell is arranged inside the first electrolysis bath while the second electrolysis cell is arranged inside the second electrolysis bath such that a water level of the supporting electrolyte in each electrolysis bath does not exceed an upper end of the corresponding electrolysis diaphragm, and wherein a water filling pipe and a drain pipe are attached to the first electrolysis cell and the second electrolysis cell, the method comprising:

introducing raw material water inside the electrolysis diaphragm of the first electrolysis cell;

electrolyzing the raw material water by applying current to the cathode and the anode of the first electrolysis cell to produce alkaline ionized water; and quantitatively and continuously transferring the alkaline ionized water formed within the electrolysis diaphragm of the first electrolysis cell to within the electrolysis diaphragm of the second electrolysis cell at a rate of 0.5 L per minute by a transfer pump arranged in the water filling pipe of the first electrolysis cell, wherein the pH value of alkaline ionized water output from the drain pipe of the second electrolysis cell is 12 or more, and wherein the current is applied such that the current applied to the first electrolysis cell is set to any value within a range of 5 amperes to 15 amperes and the current applied to the second electrolysis cell is set to any value within a range of 15 amperes to 20 amperes, such that a total current applied to the first electrolysis cell and the second electrolysis cell is within a range of 25 amperes to 30 amperes.

* * * * *